No. 618,114. Patented Jan. 24, 1899.
R. MAYER.
EDUCATIONAL DEVICE.
(Application filed Dec. 24, 1897.)
(No Model.) 2 Sheets—Sheet 1.
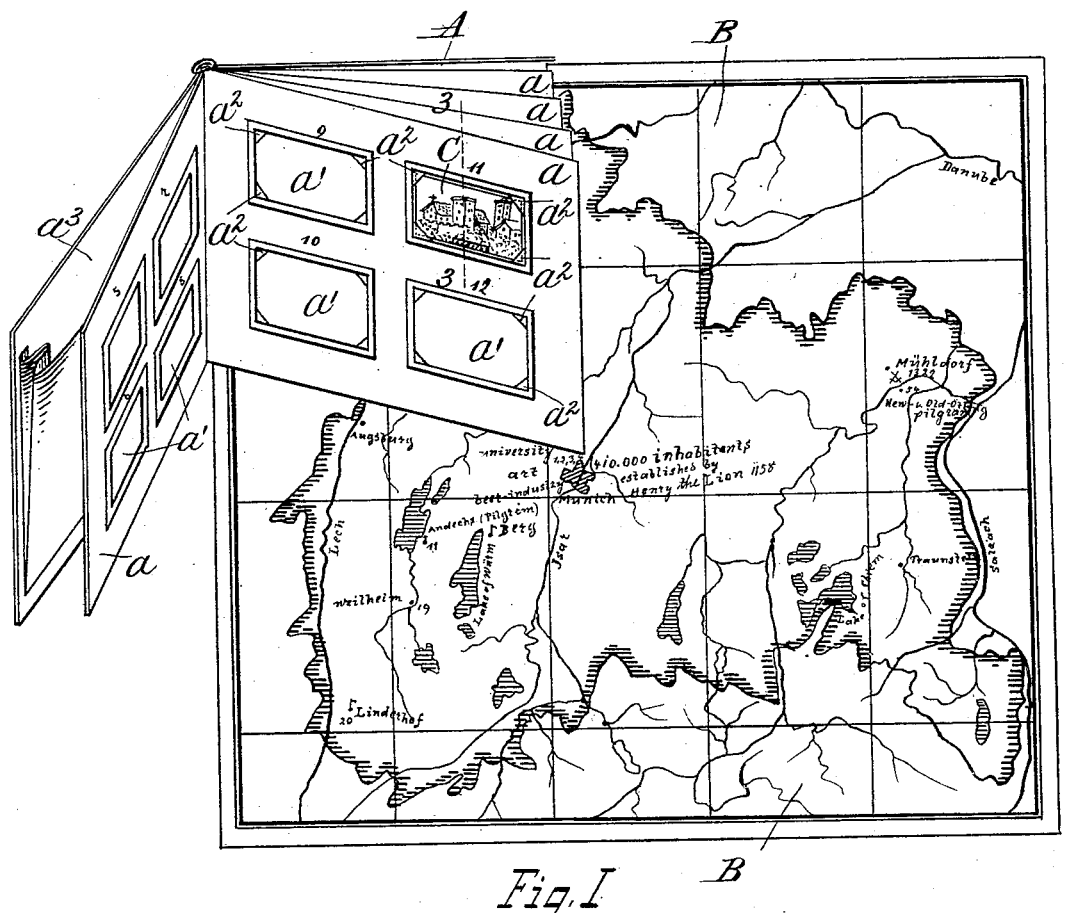
Fig. I
Witnesses:
Raymund Gloetzner.
M. C. Massie.
Inventor:
Rudolph Mayer
by May Hingii
Attorney.

No. 618,114.  Patented Jan. 24, 1899.
R. MAYER.
EDUCATIONAL DEVICE.
(Application filed Dec. 24, 1897.)
(No Model.)  2 Sheets—Sheet 2.
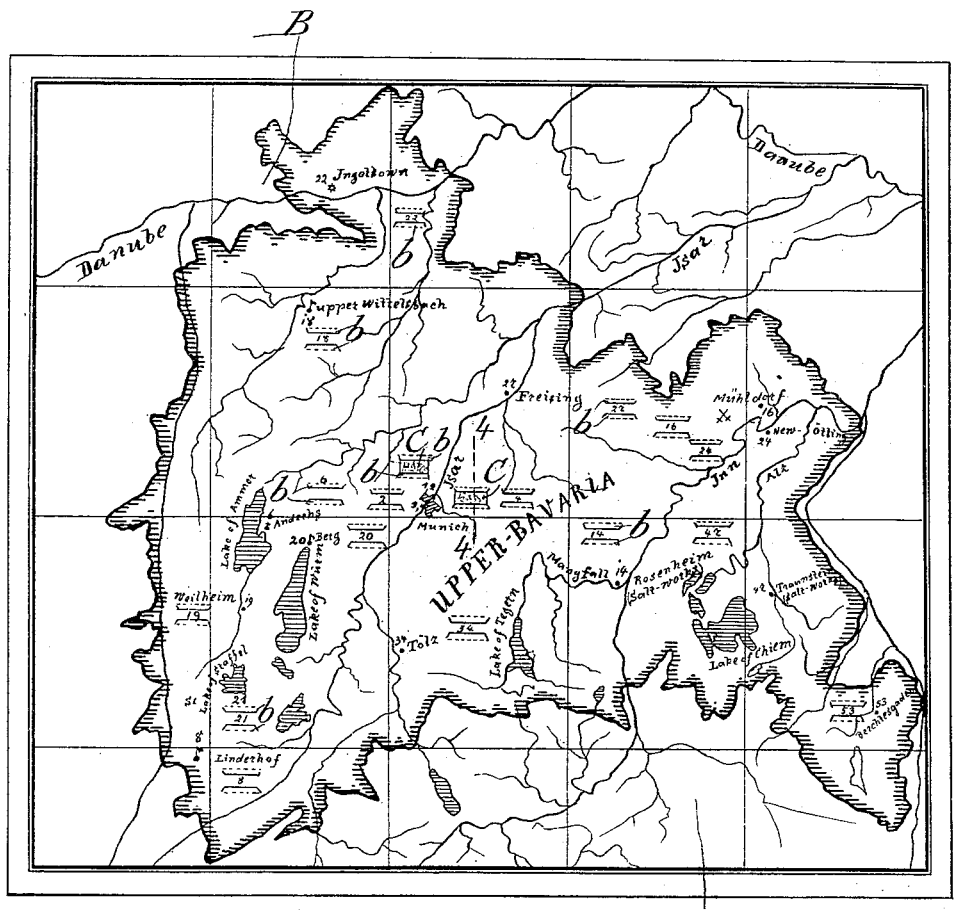
Fig. II
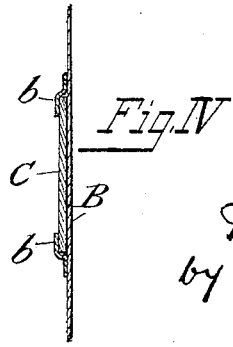
Fig. III  Fig. IV
Witnesses:
Raymund Gloetzner.
M. C. Massie.
Inventor.
Rudolph Mayer
by [signature]
Attorney.

UNITED STATES PATENT OFFICE.

RUDOLPH MAYER, OF MUNICH, GERMANY.

EDUCATIONAL DEVICE.

SPECIFICATION forming part of Letters Patent No. 618,114, dated January 24, 1899.

Application filed December 24, 1897. Serial No. 663,360. (No model.)

*To all whom it may concern:*

Be it known that I, RUDOLPH MAYER, a citizen of the Empire of Germany, residing at Munich, in the Empire of Germany, have invented certain new and useful Improvements in Educational Devices, (for which I have received patents in other countries as follows: Hungary, No. 9,277, dated April 12, 1897; France, No. 265,997, dated April 14, 1897; Great Britain, No. 9,102, dated April 9, 1897, and Switzerland, No. 14,436, dated April 7, 1897;) and I do hereby declare the following to be a full, clear, and exact description of the invention, such as will enable others skilled in the art to which it appertains to make and use the same.

My invention relates to an educational device.

The object of my invention is to provide a means for imparting instructions of a geographical, industrial, and historical or similar nature which will be entertaining and will serve to concentrate the attention upon the facts which it is the final object of the device to teach.

With this object in view a device embodying my invention, broadly considered, consists of a map, a plurality of identified pictures of localities represented and reciprocally identified on the map, and appliances for holding the pictures, each of said appliances and the corresponding locality indicated on the map (and to which the picture held by said appliance relates) being also reciprocally identified by suitable marks or characters—such, for example, as numbers.

My invention will be fully understood from the specific description given hereinafter in connection with the drawings and from the claim.

In the drawings, Figure 1 is a perspective view of one form, and Fig. 2 an elevation of another form, of device embodying my invention. Fig. 3 is a detail sectional view on the line 3 3, Fig. 1. Fig. 4 is a similar view on the line 4 4, Fig. 2.

Referring to Figs. 1 and 3, A is an album provided with appliances for holding pictures, these appliances in the present instance being leaves $a$ of the album, provided with sunken fields $a'$ and with corner-pieces $a^2$, beneath which the corners of the pictures to be held may be inserted. Each appliance for holding a picture is numbered, as shown, for a purpose hereinafter referred to. A map B is shown as attached to the album A at the back of the same, though it may be made removable from said album, if desired, and also may be attached to any part of the said album. This map is as a matter of convenience arranged to fold up and be held entirely within the album. With this album and map is employed a series of pictures showing views taken from various localities indicated on the map, one of those pictures C being shown secured in place in the album in the holding appliance marked 11. The album is provided also with a pocket $a^3$ for holding the pictures C when not in use.

The map which I have shown in the drawings in illustration of my invention represents Upper Bavaria, Germany, and it will be noted that many of the localities whose names are given are marked with a number—as, for instance, Andechs, which is given the number eleven, ("11.") Moreover, the location of Munich is marked with a plurality of numbers—viz., "1," "2," "3," and "4"—at different points around the place where said city is represented.

Each picture C shows a view taken from some locality of those on the map, provided with numbers, and these pictures may be photographs or prints and in colors or not, as desired. They are intended to show views of important buildings or scenery in or about the locality to which they relate, and each has a title upon it which indicates the locality from which the view is taken—as, for example, the name "Andechs," seen at the bottom of the picture C already secured in the album in Fig. 1, which name on said picture indicates that it shows a view taken from the locality of Andechs, the position of which place is indicated on the map.

The manner of using my device is as follows: A picture is taken up and the title upon it read, whereby the locality from which the view is taken is learned. This locality must now be found upon the map and the number of said locality as given upon said map thereby obtained. As soon as this is known the particular holding appliance having the same number is sought and the picture then secured to place in said holding appliance. Then the next picture is taken up and a similar proceeding carried out until said second picture has been placed in its proper holding appliance. These steps are supposed to be repeated until all the pictures have been put in their proper holding appliances in the album. After this the pictures may, if desired, be removed from the said holding appliances and the operation repeated, or they may be placed in the pocket $a^3$ if they are not then to be used again. It is obvious that the repetition of these steps will impress upon a scholar the relative locations of the various places indicated on the map and the scenery, buildings, or the like at the places so indicated. In addition to this certain data may be given upon the map which will catch the scholar's attention, and thus impart further knowledge. For instance, upon referring to the place marked on the map with the name of "Munich" (see Fig. 1) statements giving the number of inhabitants, the date of founding the city, name of the founder, and names of things for which said city is noted will be seen, and thereby these facts impressed upon the mind.

If it is desired to construct the device so as to aid the scholar in finding on the map the localities named by the titles of the pictures, the said location may be classified by using the same color of printing on the map for the same class of geographical (natural or artificial) features, but different colors for the different classes of features. For example, the names of all cities and towns may be in one color, the mountains in another, waterfalls in another, lakes in another, and so on. On the other hand, this classification by colors of the printing may be made a further educational feature, since, for example, the names of all cities may be printed in one color, of towns in another, and of villages in another, and thus to enable the scholar to make use of the color classification he must know upon reading the title of a picture showing scenery or buildings whether the place named is a city, village, or town, and this knowledge will itself be acquired by the repeated use of the device.

From the above description it will be seen that the pictures and the corresponding localities on the maps to which said pictures relate are reciprocally identified, since each picture and its corresponding locality are provided with the same name. Moreover, the said locality and its respective picture-holding appliance are also reciprocally identified, since each is provided with a number.

In Figs. 2 and 4 I have shown another embodiment of my invention in which the album is entirely dispensed with and the holding appliances $b$ secured to the map in the vicinity of the localities to which the pictures which they are intended to receive relate, the corresponding numbers of said holding appliances being conveniently placed in this instance directly on the map. The holding appliances shown in Figs. 2 and 4 each comprise a pair of strips $b$, secured to the face of the map and arranged to receive the picture between and beneath them.

It will be obvious that other forms of holding devices may be employed, and, indeed, if it is desired to secure the pictures permanently paste or glue may be used.

Having thus fully described my invention, what I claim is—

In an educational device, a map, a plurality of identical pictures of localities reciprocally identified on said map, and appliances for holding said pictures, each of said appliances and the corresponding locality upon the map to which the picture relates being also reciprocally identified in a manner different from said first means for reciprocal identification.

In testimony whereof I affix my signature in presence of two witnesses.

RUDOLPH MAYER.

Witnesses:
FRANCIS W. FRIGOUT,
H. D. JAMESON.